(12) United States Patent
Fukui et al.

(10) Patent No.: US 10,556,503 B2
(45) Date of Patent: Feb. 11, 2020

(54) EVAPORATED FUEL TREATMENT DEVICE

(71) Applicants: TOYOTA JIDOSHA KABUSHIKI KAISHA, Toyota-shi, Aichi-ken (JP); AISAN KOGYO KABUSHIKI KAISHA, Obu-shi, Aichi-ken (JP)

(72) Inventors: Keita Fukui, Fujinomiya (JP); Makoto Yamazaki, Gotemba (JP); Yoshikazu Miyabe, Obu (JP)

(73) Assignees: TOYOTA JIDOSHA KABUSHIKI KAISHA, Toyota-shi (JP); AISAN KOGYO KABUSHIKI KAISHA, Obu-shi (JP)

( * ) Notice: Subject to any disclaimer, the term of this patent is extended or adjusted under 35 U.S.C. 154(b) by 39 days.

(21) Appl. No.: 15/870,914

(22) Filed: Jan. 13, 2018

(65) Prior Publication Data
US 2018/0264937 A1 Sep. 20, 2018

(30) Foreign Application Priority Data

Mar. 14, 2017 (JP) .................................. 2017-048699

(51) Int. Cl.
*F02M 25/08* (2006.01)
*B60K 15/035* (2006.01)
*F02D 41/00* (2006.01)

(52) U.S. Cl.
CPC ... *B60K 15/03504* (2013.01); *F02M 25/0836* (2013.01); *F02M 25/0854* (2013.01); *F02M 25/0872* (2013.01); *F02D 41/004* (2013.01)

(58) Field of Classification Search
CPC ........... F02M 25/0809; F02M 25/0836; F02M 25/0854; F02M 25/0872; B60K 15/03504; B60K 2015/03566; B60K 2015/03576
See application file for complete search history.

(56) References Cited

U.S. PATENT DOCUMENTS

| | | | |
|---|---|---|---|
| 2011/0203554 A1* | 8/2011 | Horiba | F02D 41/0032 123/520 |
| 2015/0143996 A1 | 5/2015 | Kimoto et al. | |
| 2015/0159568 A1 | 6/2015 | Tagawa et al. | |
| 2015/0159598 A1 | 6/2015 | Tagawa et al. | |
| 2016/0152132 A1* | 6/2016 | Dedeurwaerder | F16K 17/00 137/14 |
| 2016/0356227 A1 | 12/2016 | Akita et al. | |
| 2017/0050512 A1* | 2/2017 | Ognjanovski, Jr. | B60K 15/03519 |

(Continued)

FOREIGN PATENT DOCUMENTS

| | | |
|---|---|---|
| JP | 2015-102009 A | 6/2015 |
| JP | 2015-102012 A | 6/2015 |

(Continued)

*Primary Examiner* — Thomas N Moulis
(74) *Attorney, Agent, or Firm* — Hunton Andrews Kurth LLP

(57) ABSTRACT

An evaporated fuel treatment device executes a pressure reducing control while monitoring inner pressure of a fuel tank, so that when the inner pressure of the fuel tank exceeds a predetermined value prior to fueling to the fuel tank, pressure reduction progresses within a range that the flow rate of a vapor passage does not exceed the boundary flow rate where the vapor passage is closed by a valve element of an ORVR valve, and also a valve opening speed of the closing valve is made higher as the inner pressure of the fuel tank becomes lower.

3 Claims, 11 Drawing Sheets

(56) References Cited

U.S. PATENT DOCUMENTS

2017/0292477 A1* 10/2017 Kimoto .................. F02M 37/00
2018/0274494 A1* 9/2018 Fukui ...................... F16K 17/00
                                                              137/14
2019/0032613 A1* 1/2019 Miyabe ............ B60K 15/03519

FOREIGN PATENT DOCUMENTS

| JP | 2015-110913 A | 6/2015 |
| JP | 2015-110916 A | 6/2015 |
| WO | 2015-076027 A1 | 5/2015 |
| WO | 2016/035655 A1 | 3/2016 |
| WO | WO 2016/035655 * | 3/2016 |

* cited by examiner

EVAPORATED FUEL TREATMENT DEVICE

TECHNICAL FIELD

The present invention relates to an evaporated fuel treatment device which treats evaporated fuel generated in a fuel tank of a vehicle.

BACKGROUND ART

There is known to be an evaporated fuel treatment device comprising a closing valve which is provided on a vapor passage introducing evaporated fuel (Patent Literature #1). In the Patent Literature #1, as an valve opening operation for learning an valve opening start position of the closing valve having a dead zone, disclosed is a method where the operational amount of the closing valve is changed with respect to an open direction at a first speed from zero to a valve closing boundary position in the dead zone, and after passing through the valve closing boundary position, the operational amount is changed with respect to the open direction at a second speed slower than the first speed.

CITATION LIST

Patent Literature

Patent Document #1: Japanese Patent Publication 2015-102009 A.

SUMMARY OF INVENTION

Technical Problem

On the other hand, when a vehicle having such an evaporated fuel treatment device is fueled, in order to prevent evaporated fuel in a fuel tank from being emitted from a fuel filler, executed is a pressure reducing control where the closing valve is opened to reduce inner pressure of the fuel tank prior to the fueling. On the other hand, as a valve mechanism which closes the vapor passage to block off communication between the fuel tank and the vapor passage when the fuel tank is full, in many times, a valve mechanism called an ORVR valve (an Onboard Refueling Vapor Recovery valve) having a float type valve element is provided. In this valve mechanism, the valve element leaves downward from a valve seat due to gravity to open the vapor passage at the moment of a normal state that the fuel tank is not full, and when the closing valve is opened and a flow rate of the vapor passage is increased up to the boundary, such a phenomenon occurs that the valve element is sucked toward the valve seat side to close the vapor passage.

Due to this, in the pressure reducing control of the fuel tank, the flow rate of the vapor passage is controlled so that the vapor passage is not closed by the float type valve mechanism. The flow rate of the vapor passage is determined by an opening degree of the closing valve and the inner pressure of the fuel tank. In a case that the opening degree of the closing valve is determined using the valve opening start position of the closing valve as a criterion, it is impossible to control the closing valve so as to make an intentional opening degree if the valve opening start position has been mislearned, or the valve opening start position is not held. As a result of that, during the pressure reducing control, the above phenomenon that the vapor passage is closed could occur, thereby there is a possibility that the pressure reducing control cannot be completed. In a case of a vehicle where fueling is allowed under an opening condition of a fuel lid which is satisfied by a completion of the pressure reducing control of the fuel tank, if the pressure reducing control is not completed, the fuel lid would not be opened. Thereby, a user can not access the fuel filler. Therefore, it becomes physically impossible for the user to fuel the vehicle.

Accordingly, the present invention aims to provide an evaporated fuel treatment device which can execute the pressure reducing control prior to fueling regardless of whether or not, with respect to the valve opening start position, the learning process has been executed and the learning result exists, and can avoid a state that the pressure reducing control cannot be completed because of the closed vapor passage.

Solution to Technical Problem

One aspect of the present invention provides an evaporated fuel treatment device comprising: a canister which sorbs evaporated fuel generated in a fuel tank of a vehicle; a vapor passage which connects between the canister and the fuel tank; a closing valve which is provided to the vapor passage and allowed to change an opening degree so as to control a flow rate of the evaporated fuel flowing in the vapor passage; a valve mechanism which opens and closes the vapor passage by using a displacement of a float type valve element depending on a fuel level of the fuel tank; and a control device which is a computer, and by executing a computer program, configured to execute a pressure reducing control where the closing valve is controlled so that an inner pressure of the fuel tank is reduced prior to fueling to the fuel tank, wherein the control device is configured to control the pressure reducing control with monitoring the inner pressure so that, in a case that the inner pressure exceeds a predetermined value prior to the fueling to the fuel tank, reduction of the inner pressure progresses within a range that a flow rate of the vapor passage does not exceed a boundary flow rate where the vapor passage is closed by the valve element of the valve mechanism, and a valve opening speed of the closing valve is made higher as the inner pressure becomes lower.

According to the above evaporated fuel treatment device, since the pressure reducing control is executed with monitoring the inner pressure of the fuel tank, it is unnecessary to control the closing valve using the valve opening start position of the closing valve as a criterion. Accordingly, it is possible to execute the pressure reducing control regardless of whether or not the learning process with respect to the valve opening start position of the closing valve has been executed, and whether or not the learning result exists. Further, since the pressure reducing control is executed within a range which does not exceed the boundary flow rate where the vapor passage is closed by the float type valve element, it is possible to avoid a state that the pressure reducing control of the fuel tank cannot be completed by the close of the vapor passage. Further, since the valve opening speed of the closing valve is made higher as the inner pressure of the fuel tank becomes lower, it is possible to complete the pressure reducing control in a shorter time than a case of the pressure reducing control which is executed at a constant valve opening speed.

In a case that the valve opening start position of the closing valve has been learned and is held, it is possible to use information of the valve opening start position at the moment of the pressure reducing control. For example, in one embodiment of the evaporated fuel treatment device, the closing valve may have a dead zone with respect to an open direction in a state that that the vapor passage is closed by the closing valve, and the control device may be configured to execute the pressure reducing control, so that, in a case that the control device is configured to be capable of executing a learning process for memorizing a valve opening start position where the vapor passage is allowed to open beyond the dead zone of the closing valve, and that the valve opening start position is held, the valve opening speed up to the valve opening start position is made higher than the valve opening speed after the valve opening start position. According to this embodiment, it is possible to pass through the dead zone in a short time since the valve opening speed of the closing valve up to the valve opening start position is made higher. Accordingly, it is possible to make time up to completion of the pressure reducing control in a further shorter time.

In one embodiment of the evaporated fuel treatment device as one aspect of the present invention, a plurality of determination regions with respect to the inner pressure may be provided, the plurality of determination regions being staged according to magnitude of the inner pressure, and the control device may be configured to execute the pressure reducing control so that the valve opening speed of the closing valve is kept constant within a single determination region, and the valve opening speed of the closing valve is made higher as the determination region corresponds to a lower stage. According to this embodiment, the valve opening speed of the closing valve is kept constant within a single determination region. Due to this, insecure control because of disturbance or the like is hard to occur, which makes the control stable. Therefore, it is possible to reduce a risk such that the flow rate of the vapor passage exceeds the boundary flow rate during the pressure reducing control.

In one embodiment of the evaporated fuel treatment device as one aspect of the present invention, the control device may be configured to control the closing valve, so that the closing valve is driven at a valve opening speed which is set within a range that the flow rate of the vapor passage does not exceed the boundary flow rate until change amount of the inner pressure exceeds a predetermined amount from the pressure reducing control is started. According to this embodiment, it is possible to make the valve opening speed of the closing valve higher within a range that the flow rate of the vapor passage does not exceed the boundary flow rate until the change amount of the inner pressure of the fuel tank reaches the predetermined amount. Thereby, it is possible to complete the pressure reducing control in a further shorter time.

In the present invention, the valve opening speed of the closing valve is not only a speed which is defined as temporal differentiation of the operational amount of the closing valve with respect to the open direction, but also include a change amount of the operational amount within a predetermined time. A state that the valve opening speed is made higher as the inner pressure becomes lower is not only a state that the valve opening speed changes so as to draw a gentle curve to change of the inner pressure. For example, it is also included in the state that the valve opening speed is made higher as the inner pressure becomes lower that the valve opening speed changes in such a way as to draw a polygonal line where a section where a corresponding valve opening speed is kept constant is connected in a stepwise manner and the valve opening speed for the section of a low inner pressure is higher than the valve opening speed for the section of a high inner pressure. Further, even if there is a period that the valve opening speed is zero, that is, the operation of the closing valve is stopped, if when comparing the valve opening speed under the condition that the inner pressure is low to the valve opening speed under the condition that the inner pressure is high, at least a relation that the former is higher than the latter is established, it should be understood that the closing valve is controlled so that the valve opening speed is made higher as the inner pressure becomes lower.

DESCRIPTION OF EMBODIMENTS (A First Embodiment)

Figure 1:
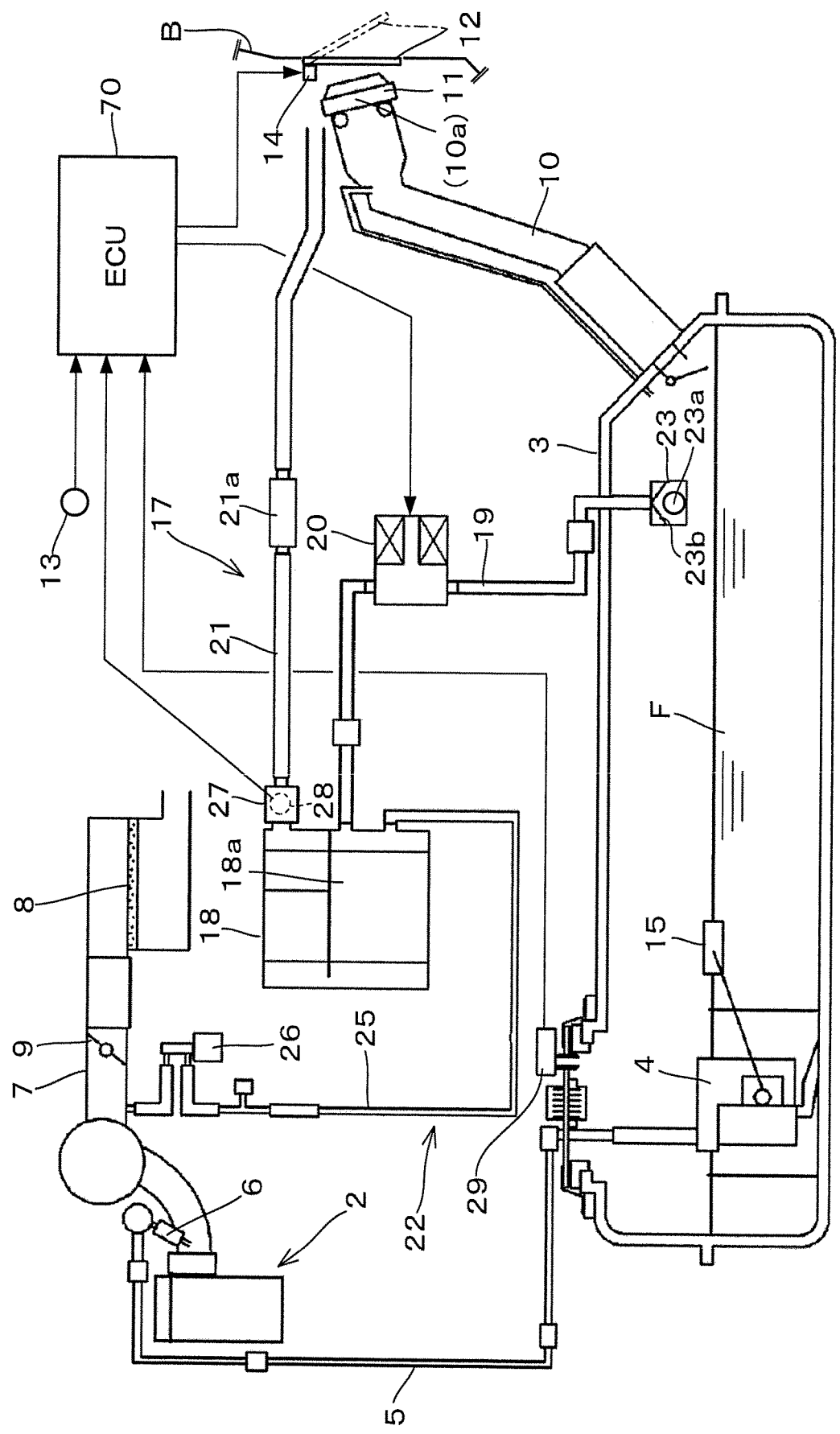
FIG. 1 is a configuration diagram schematically showing a part of a vehicle including an evaporated fuel treatment device relating to one embodiment of the present invention.

As shown in FIG. 1, a vehicle 1 comprises: an internal combustion engine 2; and a fuel tank 3. The internal combustion engine 2 is provided as a driving source for travelling and configured as a gasoline engine. The fuel tank 3 stores gasoline which is fuel for the internal combustion engine 2. Fuel F stored in the fuel tank 3 is sucked up by a fuel pump 4, and supplied to an intake passage 7 of the internal combustion engine 2 via a feed pipe 5 and a fuel injection valve 6. The intake passage 7 is provided with an air filter 8 for air filtration and a throttle valve 9 for adjusting the amount of intake air.

The fuel tank 3 is provided with an inlet pipe 10 for fueling. At the end portion of the inlet pipe 10, a fuel filler 10a is formed. The fuel filler 10a is covered by a fuel cap 11 which is detachable by a user at the moment of fueling. The fuel cap 11 is, at the moment of non-fueling, hidden by a fuel lid 12 provided to a body B of the vehicle 1. When a fueling button 13 is pressed by a user, the fuel lid 12 is opened by a lid driving device 14 under a condition that pressure reducing control described later has been completed. Thereby, the user is allowed to access the fuel cap 11, and the fueling becomes possible. The remaining amount of the fuel F stored in the fuel tank 3 is detected by a float type of remaining amount sensor 15.

The vehicle 1 is provided with an evaporated fuel treatment device 17 for treating evaporated fuel generated in the fuel tank 3. The evaporated fuel treatment device 17 comprises: a canister 18; a vapor passage 19; a closing valve 20;

an atmosphere communicating pipe 21; and a purge device 22. The canister 18 has an adsorbent 18a therein for sorbing evaporated fuel. The vapor passage 19 connects between the canister 18 and the fuel tank 3. The closing valve 20 is provided on the vapor passage 19, capable of opening and closing the vapor passage 19, and also capable of changing its opening degree so as to control the flow rate of evaporated fuel flowing in the vapor passage 19. The atmosphere communicating pipe 21 is provided to the canister 18 and opened to the atmosphere. The purge device 22 supplies purge gas to the intake passage 7 of the internal combustion engine 2 by ambient air introduced into the canister 18 via the atmosphere communicating pipe 21, the purge gas being separated from the canister 18.

An ORVR valve 23 as one example of a valve mechanism relating to the present invention is provided at a connection portion of the vapor passage 19 and the fuel tank 3. The ORVR valve 23 blocks off the communication between the vapor passage 19 and the fuel tank 3 by closing the vapor passage 19, in a case that the liquid level of the fuel F in the fuel tank 3 has reached the installation height, that is, the fuel level of the fuel tank 3 has reached the boundary and becomes full. The ORVR valve 23 comprises: a float type valve element 23a which closes the vapor passage 19 in a case that the fuel level of the fuel tank 3 has reached the boundary; and a valve seat 23b where the valve element 23a is appressed in the valve closing state. As shown in FIG. 1, when the fuel tank 3 is not full, the valve element 23a leaves downward from the valve seat 23b due to gravity, thereby opens the vapor passage 19. On the other hand, when the closing valve 20 opens and the flow rate of the vapor passage 19 increases until exceeding the boundary flow rate, a phenomenon where the body element 23a is sucked toward the valve seat 23b side and the ORVR valve 23 closes the vapor passage 19, sometimes occurs.

The purge device 22 comprises: a purge passage 25 for connecting between the canister 18 and the intake passage 7 of the internal combustion engine 2 to introduce purge gas to the internal combustion engine 2; and a purge controlling valve 26 provided on the purge passage 25. The purge controlling valve 26 is configured as a vacuum switching valve (VSV) which operates by negative pressure of the intake passage 7. When the purge controlling valve 26 opens, ambient air is introduced into the canister 18 via the atmosphere communicating pipe 21, and the mentioned purge gas is supplied to the intake passage 7 of the internal combustion engine 2. The ambient air which is introduced into the canister 18 is filtered by the air filter 21a provided on the atmosphere communicating pipe 21.

A key-off pump 27 is provided at a connection portion of the atmosphere communicating pipe 21 and the canister 18. The key-off pump 27 is provided for a check for detecting an abnormal state, such as holes, of check objects, such as the canister 18 and the fuel tank 3. The key-off pump 27 has, not only a pump which is driven for the check, but also a pressure sensor 28 therein for measuring a pressure of the inside of the canister 18. On the other hand, a pressure of the inside (the inner pressure) of the fuel tank 3 is measured by a pressure sensor 29 as one example of a detecting device of the present invention, the pressure sensor 29 being provided to the fuel tank 3.

Figure 2:
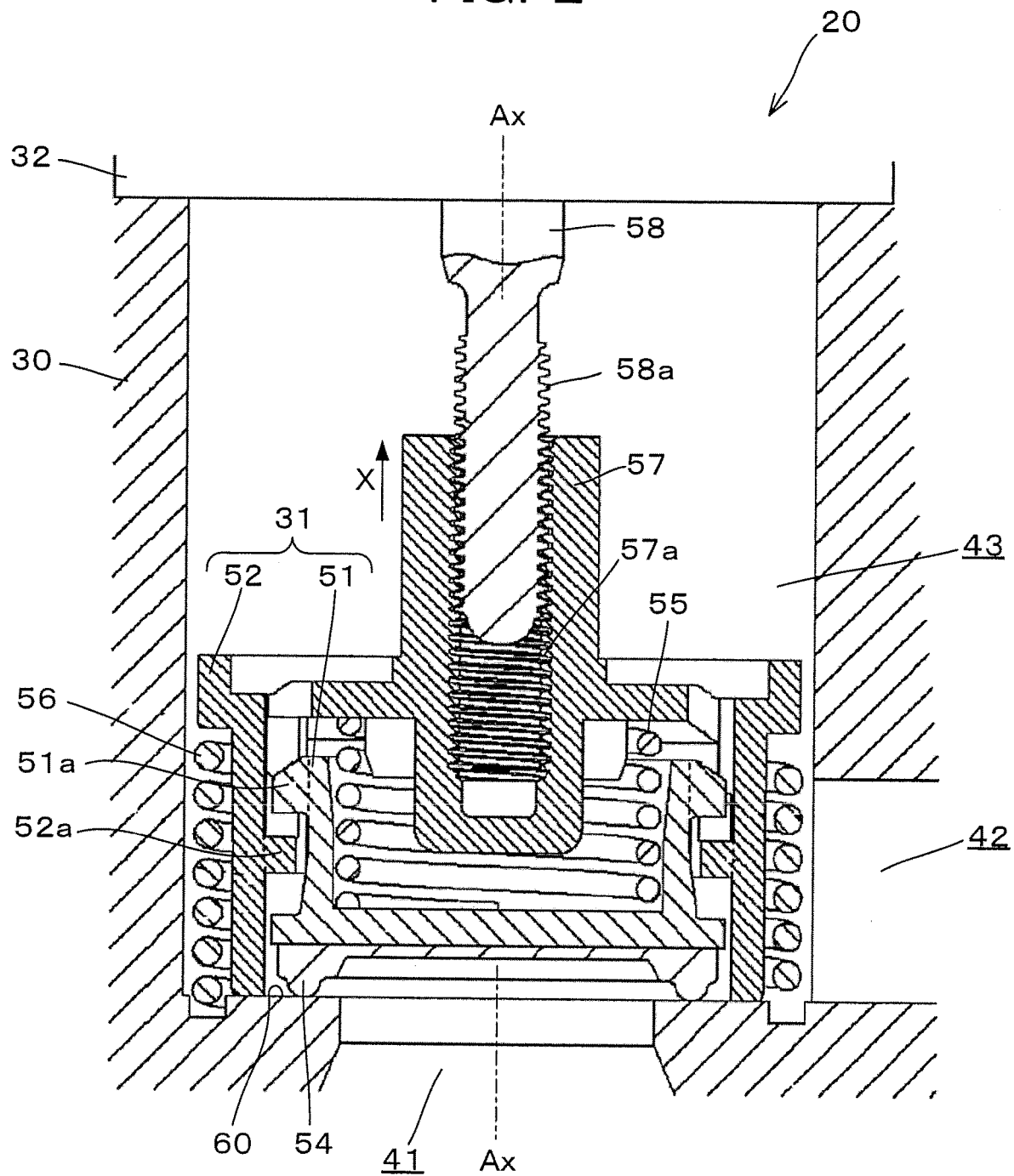
FIG. 2 is cross-sectional view showing a configuration of a closing valve.

FIG. 2 shows details of the closing valve 20, which is configured as a flow-rate controlling valve which closes the vapor passage 19 in its valve closing state, and opens the vapor passage 19 in its valve opening state, and also, is capable of controlling the flow rate of evaporated fuel by changing the opening degree thereof in the valve opening state. As shown in FIG. 2, the closing valve 20 comprises: a casing 30; a valve element 31 housed in the casing 30; and a stepping motor 32 which drives the valve element 31.

In the casing 30, an inflow conduit 41 which evaporated fuel flows into; an outflow conduit 42 which evaporated fuel flows out from; and a valve chamber 43 which communicates each of the inflow conduit 41 and the outflow conduit 42 and houses the valve element 31, are formed. The valve element 31 includes: an inner side valve portion 51 capable of closing the inflow conduit 41; and a guiding portion 52 which is disposed so as to surround the inner side valve portion 51, and where the upper side in FIG. 2 is closed and the lower side in FIG. 2 is opened. The inner side valve portion 51 and the guiding portion 52 are combined coaxially using the axial line Ax as a center so that they are allowed to move correlatively with each other with respect to the direction of the axial line Ax. At the lower end of the inner side valve portion 51, for example, a seal member 54 composed of synthetic rubber is provided. The seal member 54 closes the inflow conduit 41 when being appressed to a valve seat 60 of the casing 30, the valve seat 60 being provided at an opening portion of the inflow conduit 41.

Between the inner side valve portion 51 and the guiding portion 52, a coil spring 55 is provided in a compressed state, the coil spring 55 biasing the inner side valve portion 51 to the valve seat 60 side. The guiding portion 52 is provided in the casing 30 in a movable state with respect to the direction of the axial line Ax and also in a rotatable state around the axial line Ax. Further, between the guiding portion 52 and the casing 30, a coil spring 56 is provided in a compressed state. Due to the elastic force of the coil spring 56, the guiding portion 52 is biased in a direction away from the valve seat 60. The upper portion of the guiding portion 52 is provided with a female screw portion 57. A female screw 57a formed in the female screw portion 57 is engaged with a male screw 58a formed in an output shaft 58 of the stepping motor 32. Thereby, depending on the operational amount of the stepping motor 32, the guiding portion 52 of the valve element 31 is made to move in an open direction shown as an arrow X and also in a close direction which is an opposite direction of the open direction.

FIG. 2 shows that a state of the guiding portion 52 of the valve element 31 is an initial position, where the lower end of the guiding portion 52 is located at a boundary with respect to the close direction, where the lower end contacts the valve seat 60, and also the vapor passage 19 is closed. In this initial position, the seal member 54 of the inner side valve portion 51 is pressed to the valve seat 60 due to the elastic force of the coil spring 55, thereby the closing valve 20 is in the valve closing state. When the stepping motor 32 is driven so that the guiding portion 52 moves in the open direction from the initial position, the lower end of the guiding portion 52 starts to leave from the valve seat 60. And then, when the operational amount with respect to the open direction increases, a protruding portion 52a which is provided to the guiding portion 52 and protruding inward and a protruding portion 51a which is provided to the inner side valve portion 51 and protruding outward are butted with each other. Until these protruding portions 52a and 51a are butted with each other, the closing valve 20 is kept in the valve closing state where the seal member 54 of the inner side valve position 51 is pressed to the valve seat 60. When the guiding portion 52 is further operated in the open direction in a state that these protruding portions 52a and 51a are being butted with each other, the guiding portion 52 and the inner side valve portion 51 move together in the open direction, and the seal member 54 of the inner side valve portion 51 leaves from the valve seat 60. Thereby, since the inflow conduit 41 is opened, the inflow conduit 41 and outflow conduit 42 are communicated each other via the valve chamber 43, and open of the vapor passage 19 is allowed.

In this way, while the guiding portion 52 operates with respect to the open direction from the initial position until the protruding portion 52a of the guiding portion 52 and the protruding portion 51a of the inner side valve portion 51 are butted with each other, the closing valve 20 is kept in the valve closing state. Due to this, it is a valve closing range that is the operational range of the closing valve 20 where the guiding portion 52 operates in the open direction from the initial position until the protruding portions 51a and 52a are butted with each other, and the operational range corresponds to one example of the dead zone relating to the present invention. And, it is the position where the seal member 54 of the inner side valve portion 51 leaves from the valve seat 60 by making the guiding portion 52 operate in the open direction with the protruding portions 51a and 52a being butted with each other, that corresponds to one example of the valve opening start position relating to the present invention.

Variations of this valve opening start position could be generated due to tolerance of the guiding portion 52, the inner side valve portion 51, or the like of the closing valve 20, or secular change of them. Therefore, a learning process for detecting and memorizing the valve opening start position which is unique to the closing valve 20, is executed. As one example, the learning process is executed by an engine control unit (ECU) 70 configured as a computer which controls operations of the internal combustion engine 2.

Figure 3:
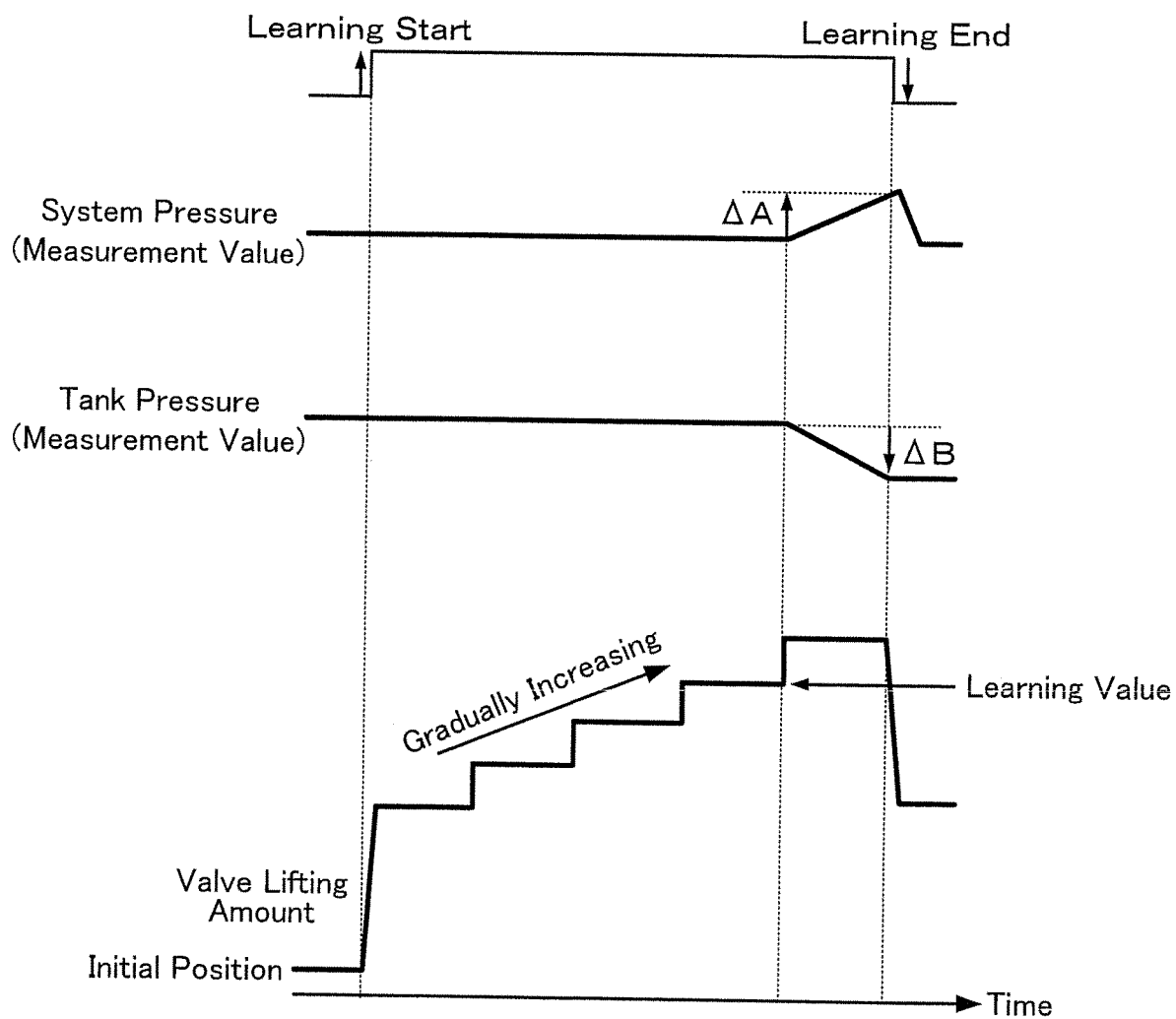
FIG. 3 is a time chart showing one example of learning process.

As shown in FIG. 1, to the ECU 70, an output signal from the pressure sensor 28 built in the key-off pump 27 and an output signal from the pressure sensor 29 provided to the fuel tank 3. The ECU 70 operates, while monitoring a measurement value of pressure corresponding to each of the output signals, the stepping motor 32 of the closing valve 20 to execute the learning process for the valve opening start position. For example, as shown in FIG. 3, the ECU 70 increases the operational amount with respect to the open direction of the closing valve 20 (the valve lifting amount) gradually in a stepwise manner from the initial position. The increased amount per increase is set as appropriate to a few-steps rotational amount (for example, four steps) of the stepping motor 32. In a case of detecting increase by at least specified pressure ΔA with respect to the pressure in the canister 18 (system pressure) or decrease by at least specified pressure ΔB with respect to the inner pressure of the fuel tank 3 (tank pressure), the increase or the decrease being caused by the operation with respect to the open direction of the closing valve 20, the ECU 70 memorizes the operational amount one time ago as the learning value of the valve opening start position.

Further, the ECU 70 opens the closing valve 20 prior to the fueling to the fuel tank 3 to execute the pressure reducing control for reducing the inner pressure of the fuel tank 3, in order to prevent the evaporated fuel in the fuel tank 3 from being emitted from the fuel filler 10a to the atmosphere at the moment of the fueling.

Figure 4:
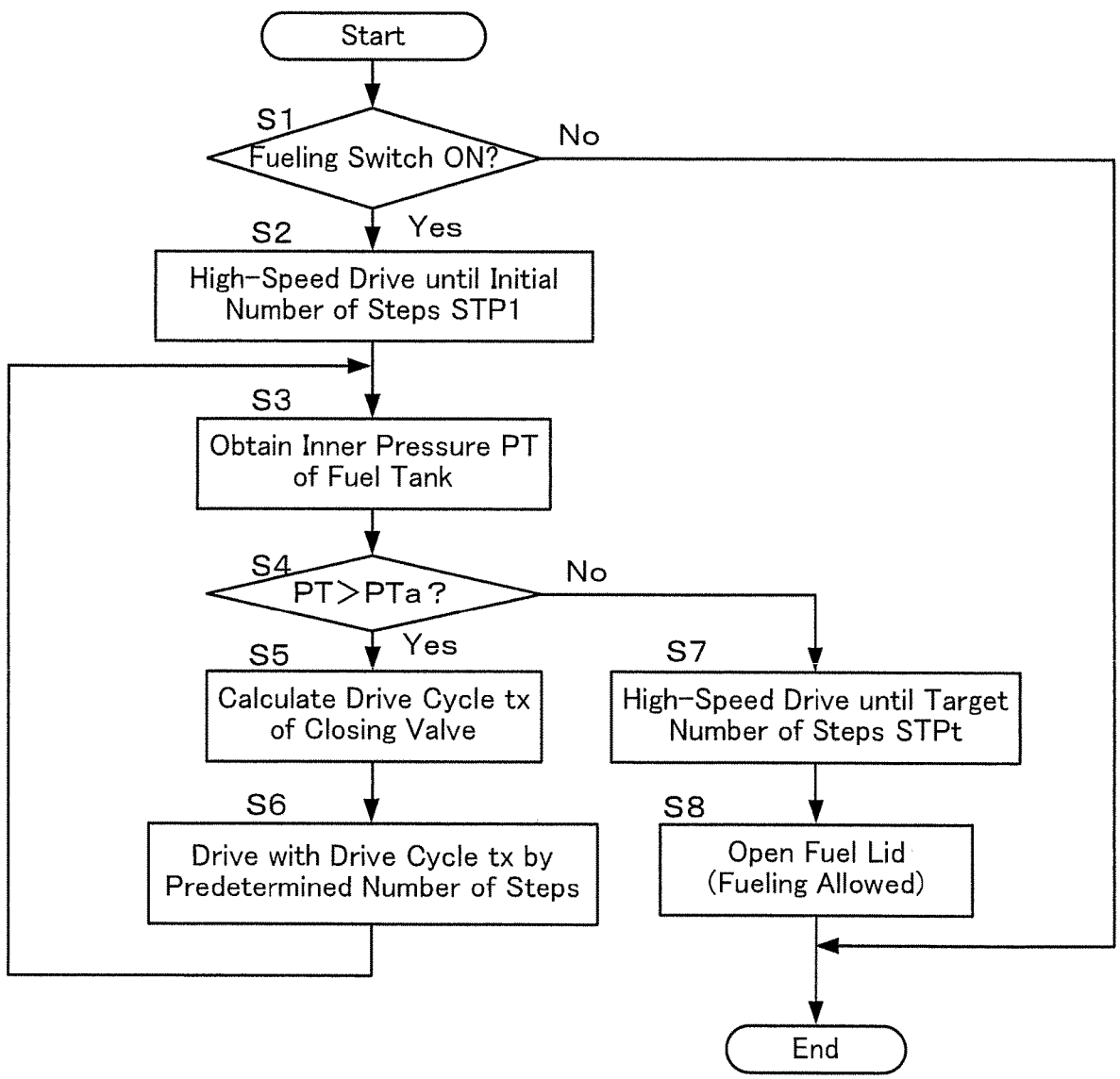
FIG. 4 is a flow chart showing one example of a control routine relating to a first embodiment.

FIG. 4 shows one example of a control routine executed by the ECU 70. The computer program for the control routine shown in FIG. 4 is read out as appropriate and executed repeatedly at predetermined intervals by the ECU 70. The ECU 70 functions as one example of a control device relating to the present invention by executing the control routine of FIG. 4.

In step S1, the ECU 70 determines whether or not the fueling switch 13 has been pushed. In a case that the fueling switch 13 has been pushed, the ECU 70 goes to step S2. In a case that the fueling switch 13 has not been pushed, the ECU 70 skips the following processes and ends the current routine.

In step S2, the ECU 70 drives the stepping motor 32 at high speed until an initial number of steps STP1. The initial number of steps STP1 is set in advance as the number of steps of the stepping motor 32 corresponding to the operational amount with respect to the open direction from the initial position (refer to FIG. 2), the operational amount making the closing valve 30 structurally stay within the dead zone surely. Generally, a stepping motor operates one step when one pulse is supplied. Accordingly, in a case that time between pulses to be supplied to the stepping motor 32 is defined as a drive cycle, it is possible to represent a valve opening speed of the closing valve 20 by using the drive cycle. As the drive cycle is shorter, the valve opening speed of the closing valve 20 becomes higher, and as the drive cycle is longer, the valve opening speed of the closing valve 20 becomes lower. With respect to the high-speed drive in step S2, the drive cycle is set to a constant value, for example, 6 [ms].

In step S3, the ECU 70 obtains the inner pressure PT of the fuel tank 3, by referring to the output signal from the pressure sensor 29 provided to the fuel tank 3. Next, in step S4, the ECU 70 determines whether or not, the inner pressure PT of the fuel tank 3 is higher than a predetermined value PTa. The predetermined value PTa is set as appropriate as an upper limit of the inner pressure PT of the fuel tank 3, the upper limit ensuring that the flow rate of the vapor passage 19 does not exceed the boundary flow rate where the ORVR valve 23 closes the vapor passage 19 even if the closing valve 20 is opened with any opening degree.

Accordingly, in a case that the inner pressure PT of the fuel tank 3 is higher than the predetermined value PTa, there is a possibility that the flow rate of the vapor passage reaches the boundary flow rate depending on the open degree of the closing valve 20. Due to this, the ECU 70 goes to step S5. On the other hand, in a case that the inner pressure PT is equal to the predetermined value PTa or less, the flow rate of the vapor passage 19 does not exceed the boundary flow rate even if the closing valve 20 is opened with any open degree. Due to this, the ECU 70 goes to step S7 to drive the stepping motor 32 at high speed until a target number of steps STPt for completing the pressure reducing control. The target number of steps STPt is the number of steps of the stepping motor 32 for corresponding to the opening degree of the closing valve 20 which makes it sufficiently possible to reduce the pressure in the fuel tank 3, and for example, is set as the number of steps for making the closing valve 20 entirely opened. With respect to the high-speed drive in step S7, the drive cycle is set to a constant value, for example, 6 [ms]. In next step S8, the ECU 70 controls the lid driving device 14 so as to open the fuel lid 12. Thereby, the fueling to the fuel tank 3 becomes possible. Then, the ECU 70 ends the routine.

In step S5, the ECU 70 calculates a drive cycle tx of the closing valve 20, within a rage that the flow rate of the vapor passage 19 does not exceed the boundary flow rate on the inner pressure PT measured. For example, this drive cycle tx is calculated by making the ECU 70 refer to a map (not illustrated) which is made based expeliments on an actual machien, simulations, or the like, and has a data structure which uses the inner pressure PT as a variable and provides a drive cycle tx of the closing valve 20 within a range that the boundary flow rate is not exceeded. In the map, the inner pressure PT and the drive cycle tx are set so that as the inner pressure PT of the fuel tank 3 is lower the drive cycle tx becomes shorter, that is, as the inner pressure PT is lower, the valve opening speed of the closing valve 20 becomes higher.

In step S6, the ECU 70 drives the stepping motor 32 by a predetermined number of steps with the drive cycle tx calculated in step S5, and returns to step S3. The predetermined number of steps is set as appropriate in consideration of the calculation speed of the ECU 70 and the like. In this embodiment, for example, the predetermined number of steps is set to five steps. The processes from step S3 to step S6 are repeated until it is determined that the inner pressure PT is the predetermined value PTa or less in step S4. In step S5, as the inner pressure PT of the fuel tank 3 is lower, the calculated drive cycle becomes shorter. Accordingly, by repeating the processes from step S3 to step S6, the pressure reducing control is executed, while monitoring the inner pressure PT of the fuel tank 3, so that as the inner pressure PT of the fuel tank 3 gets lower, the valve opening speed of the closing valve 20 gets higher within the rage that the flow rate of the vapor passage 19 does not exceed the boundary flow rate.

Figure 5:
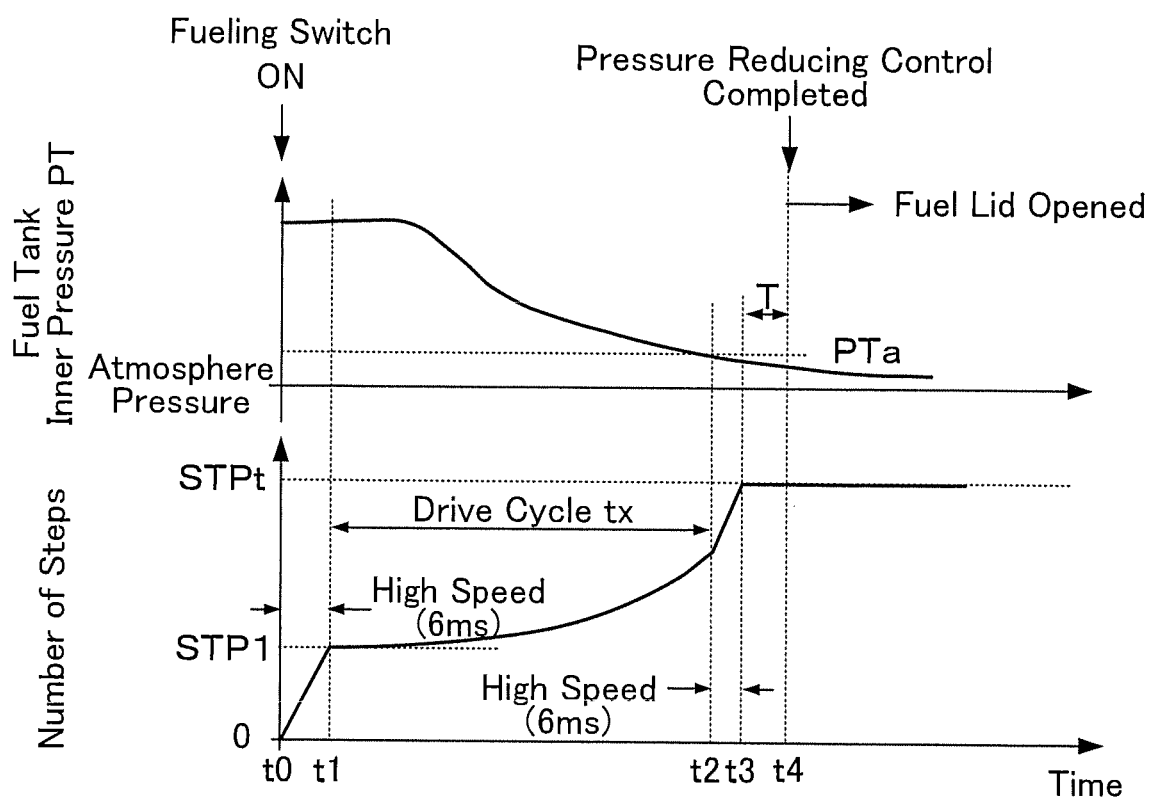
FIG. 5 is a time chart schematically showing one example of a control result relating to the first embodiment.

FIG. 5 schematically shows one example of a result of control executed by the ECU 70. As shown in FIG. 5, when the fueling switch 13 is set to ON at time t0, the closing valve 20 is driven at high speed until time t1 when the number of steps reaches the initial number of steps STP1. The initial number of steps STP1 is set so that the closing valve 20 stays within the dead zone. Due to this, from time t0 to time t1 the closing valve 20 is kept in the valve closing state. In this case, the inner pressure PT of the fuel tank 3 is larger than the predetermined value PTa. Accordingly, when the number of steps reaches the initial number of steps STP1 at time t1, the drive of the closing valve 20 is started with the drive cycle tx calculated appropriately for the inner pressure PT obtained. The drive with the drive cycle tx is continued until time t2 when the inner pressure PT becomes equal to the predetermined value PTa or less. When the inner pressure PT reaches the predetermined value PTa at time t2, the drive is switched to the high-speed drive and the closing valve 20 is driven at high speed from time t2 to time t3 when the number of steps reaches the target number of steps STPt. In the present invention, the completion of the pressure reducing control is determined under the condition that a predetermined time has elapsed from the moment when the number of steps reaches the target number of steps STPt, and the lid driving device 14 is operated at time t4 to open the fuel lid 12. Alternatively, the completion of the pressure reducing control may be determined based on the inner pressure.

According to the present embodiment, since the ECU 70 executes the pressure reducing control while monitoring the inner pressure PT of the fuel tank 3, it is unnecessary to control the closing valve 20 using the valve opening start position of the closing valve 20 as a criterion. Accordingly, it is possible to execute the pressure reducing control prior to the fueling without depending on the learning result of the valve opening start position of the closing valve 20. Further, the pressure reducing control is executed using the drive cycle tx calculated within the rage that the flow rate of the vapor passage 19 does not exceed the boundary flow rate which makes the float type valve element 23a provided in the ORVR valve 23 close the vapor passage 19. Thereby, it is possible to avoid a state that the vapor passage 19 is closed by the ORVR valve 23 and thereby the pressure reducing control of the fuel tank 3 can not be completed. Further, the valve opening speed of the closing valve 20 is controlled so as to become higher as the inner pressure PT of the fuel tank 3 gets lower. Thereby, it is possible to complete the pressure reducing control in a shorter time in comparison with a case that the pressure reducing control is executed at a constant valve opening speed.

(A Second Embodiment)

Figure 6:
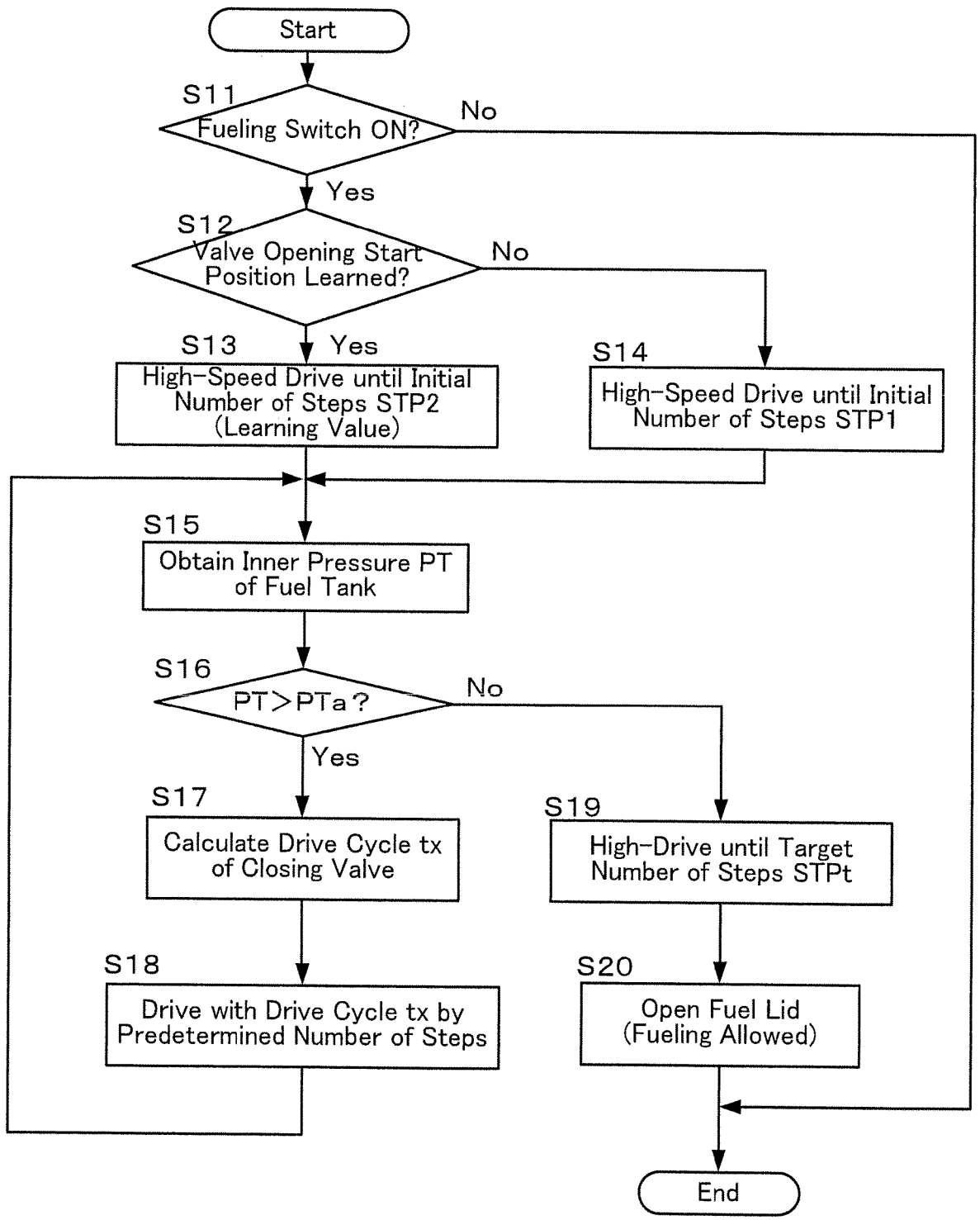
FIG. 6 is a flow chart showing one example of a control routine relating to a second embodiment.
Figure 7:
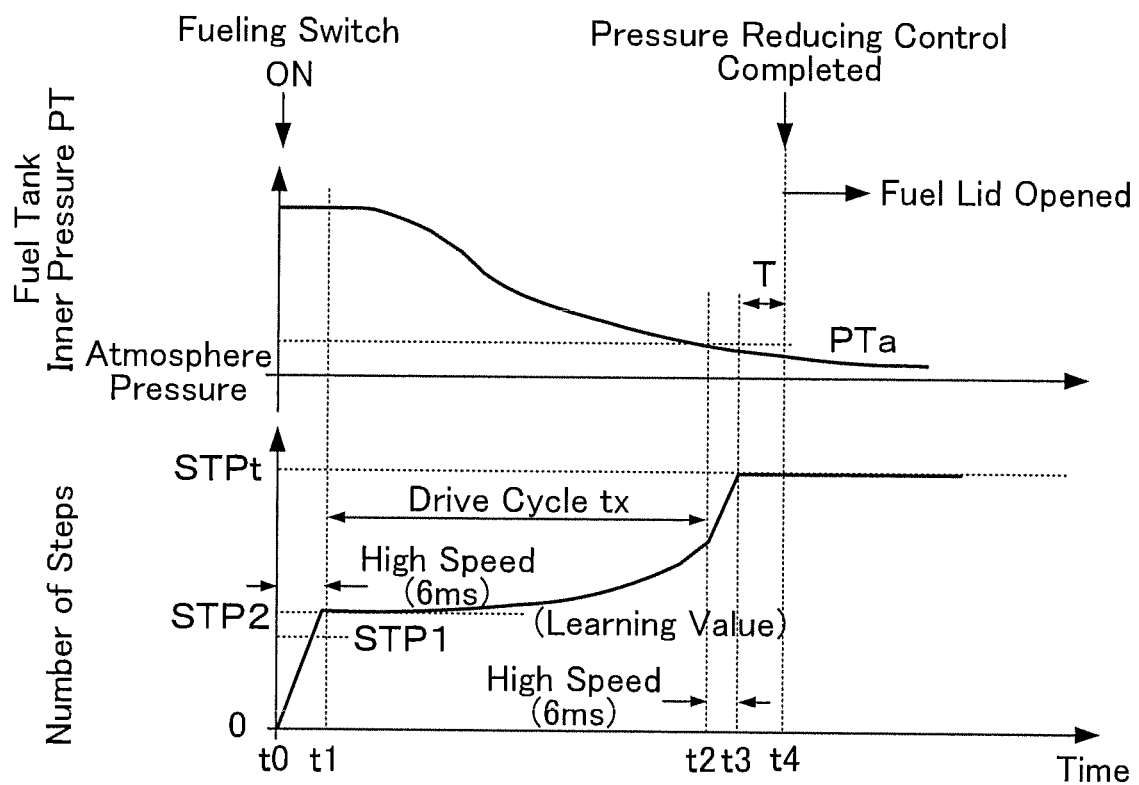
FIG. 7 is a time chart schematically showing one example of a control result relating to the second embodiment.

Next, the following describes the second embodiment of the present invention in reference to FIGS. 6 and 7. The second embodiment is shared with the first embodiment except the pressure reducing control. Accordingly, in the following descriptions, the descriptions, such as physical constructions, to be shared with the first embodiment are omitted, and the descriptions and figures in the first embodiment should be referred to as appropriate.

The ECU 70 executes a control routine shown in FIG. 6 to realize the control in the second embodiment, and thereby the ECU 70 functions as one example of a control device relating to the present invention. In the second embodiment, the ECU 70 executes the pressure reducing control using the learning value of the valve opening start position of the closing valve 20, the learning value being held by the ECU 70 in the learning process for the valve opening start position. The computer program for the control routine shown in FIG. 6 is read out as appropriate and repeatedly executed at predetermined intervals by the ECU 70.

In step S11, the ECU 70 determines whether the fueling switch 13 has been set to ON. In a case that the fueling switch 13 has been set to ON, the ECU 70 goes to step S12, and if not, the ECU 70 skips the following steps and ends the routine.

In step S12, the ECU 70 determines whether or not the learning process for the valve opening start position of the closing valve 20 has been executed. In a case that the learning process has been executed and the valve opening start position is held as the learning value, the ECU 70 drives, in step S13, the stepping motor 32 at high speed until the initial number of steps STP2 which is the number of steps required from the initial position until the valve opening start position. In this case, the drive cycle is set to, for example, 6 ms. On the other hand, in a case that the learning process has not been executed, as with the first embodiment, the ECU 70 drives, in step S14, the stepping motor 32 at high speed with the drive cycle, for example, 6 ms, until the initial number of steps STP1 which structurally makes the closing valve 20 stay within the dead zone.

The processes from step S15 to step S20 are the same as the processes from step S3 to step S8 shown in FIG. 4 for the first embodiment, thereby the descriptions therefor are omitted.

According to the second embodiment, similar effects to the first embodiment are obtained Further, according to the second embodiment, as apparently shown in FIG. 7, in a case that the learning process has been executed and the valve opening start position of the closing valve 20 is held, the stepping motor 32 is driven at high speed until the initial number of steps STP2 which is more than the initial number of steps STP1 to be used for the case that the learning process has not been executed. That is, the valve opening speed of the closing valve 20 until the valve opening start position is higher than the valve opening speed after passing through the valve opening start position. Therefore, in a case that the valve opening start position is held, it is possible to pass through the dead zone in a short time. Accordingly, it is possible to reduce time required until the completion of the pressure reducing control.

(A Third Embodiment)

Figure 8:
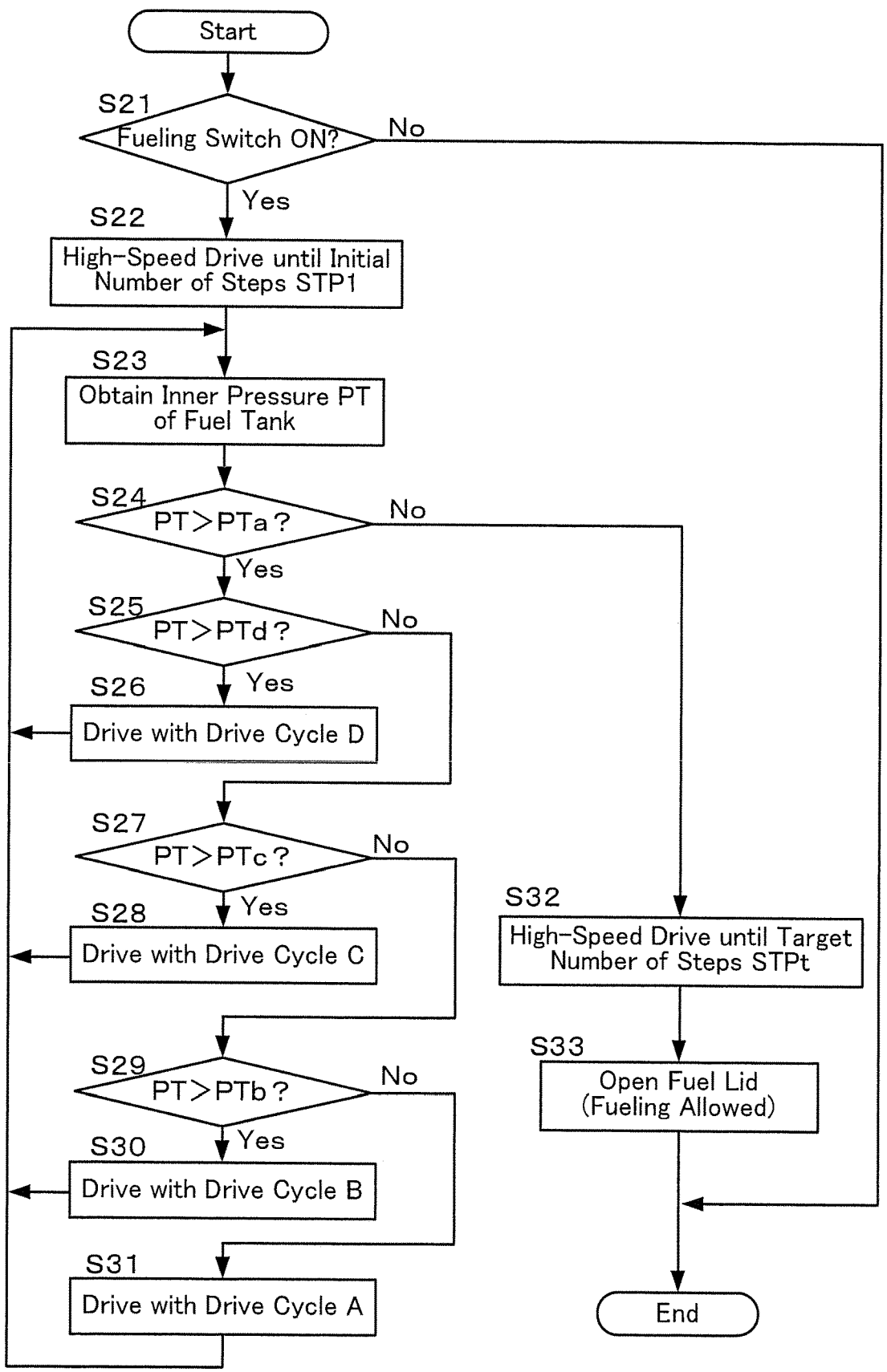
FIG. 8 is a flow chart showing one example of a control routine relating to a third embodiment.
Figure 9:
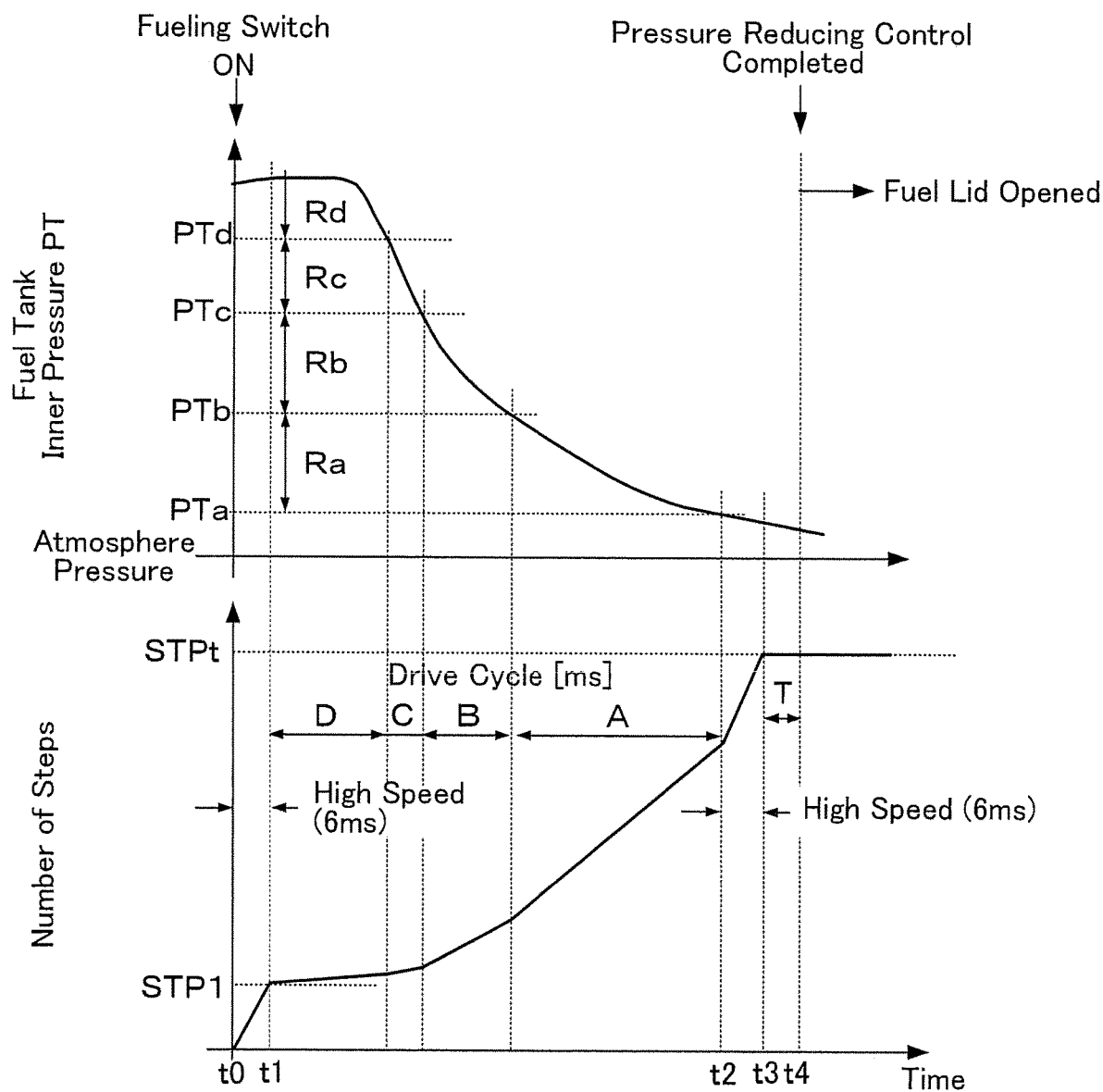
FIG. 9 is a time chart schematically showing one example of a control result relating to the third embodiment.

Next, the following describes the third embodiment in reference to FIGS. 8 and 9. The third embodiment is shared with the first embodiment except the pressure reducing control. Accordingly, in the following descriptions, the descriptions, such as physical constructions, to be shared with the first embodiment are omitted, and the descriptions and figures in the first embodiment should be referred to as appropriate.

The ECU 70 executes a control routine shown in FIG. 8 to realize the control in the third embodiment, and thereby the ECU 70 functions as one example of a control device relating to the present invention. In the third embodiment, a plurality of determination regions where the magnitude of the inner pressure of the fuel tank 3 is staged is set and a valve opening speed of the closing valve 20 is kept constant in each of the plurality of determination regions for executing the pressure reducing control. The computer program for the control routine shown in FIG. 8 is read out as appropriate and repeatedly executed at predetermined intervals by the ECU 70.

In step S21, the ECU 70 determines whether or not the fueling switch 13 is set to ON. In a case that the fueling switch 13 is set to ON, the ECU 70 goes to step S22, and if not, the ECU 70 skips the following steps and ends the routine. In step S22, the ECU 70 drives the stepping motor 32 at high speed until the initial number of steps STP1. For the high-speed drive in step S22, the drive cycle is set to a constant value, for example, 6 [ms]. In step S23, the ECU 70 obtains the inner pressure of the fuel tank 3 by referring to the output signal of the pressure sensor 29 provided to the fuel tank 3.

In the processes of steps S24 to S31, the ECU 70 sets the plurality of determination regions where the magnitude of the inner pressure PT of the fuel tank 3 is staged, and drives the closing valve 20 with a constant drive cycle set for each determination region. In the present embodiment, as shown in FIG. 9, four determination regions Ra to Rd are set with respect to the inner pressure PT, and four drive cycles A to D are set for the four determination regions Ra to Rd respectively. Each of the drive cycles A to D is set as a drive cycle within a range that the flow rate of the vapor passage 19 does not exceed the boundary flow rate on the inner pressure PT of the corresponding determination region Ra to Rd. The details thereof are as follows.

Determination Region Ra: PT≤PTa, Drive Cycle A
Determination Region Rb: PTb<PT≤PTc, Drive Cycle B
Determination Region Rc: PTc<PT≤PTd, Drive Cycle C
Determination Region Rd: PT>PTd, Drive Cycle D With respect to the threshold values PTa to PTd, the relation PTa<PTb<PTc<PTd is established, and with respect to the drive cycles A to D, the relation A<B<C<D is established.

In step S24, the ECU 70 determines whether or not the inner pressure PT of the fuel tank 3 is higher than the predetermined value PTa. The predetermined value PTa is the same as the one in the first embodiment. Accordingly, in a case that the inner pressure PT of the fuel tank 3 is higher than the predetermined value PTa, the ECU 70 executes the processes from step S25 to step S31 so that the flow rate of the vapor passage 19 does not exceed the boundary flow rate. On the other hand, in a case that the inner pressure PT of the fuel tank 3 is equal to the predetermined value PTa or less, the flow rate of the vapor passage 19 does not exceed the boundary flow rate even if the closing valve 20 opens with any open degree. Accordingly, the ECU 70 goes to step S32 to drive the stepping motor 32 at high speed until the target number of steps STPt for completing the pressure reducing control. And then, in step S33, the ECU 70 controls the lid driving device 14 so as to open the fuel lid 12 and ends the routine.

In step S25, the ECU 70 determines whether or not the inner pressure PT is higher than the predetermined value PTd. In a case that the inner pressure PT is higher than the predetermined value PTd, that is, the inner pressure PT belongs to the above mentioned determination region Rd, the ECU 70 drives the closing valve 20 with the drive cycle D in step S26 and returns to step S23. On the other hand, in a case that the inner pressure PT is equal to the predetermined value PTd or less, the ECU 70 goes to step S27.

In step S27, the ECU 70 determines whether or not the inner pressure PT is higher than the predetermined value PTc. In a case that the inner pressure PT is higher than the predetermined value PTc, that is, the inner pressure PT belongs to the above mentioned determination region Re, the ECU 70 drives the closing valve 20 with the drive cycle C in step S28 and returns to step S23. On the other hand, in a case that the inner pressure PT is equal to the predetermined value PTc or less, the ECU 70 goes to step S29.

In step S29, the ECU 70 determines whether or not the inner pressure PT is higher than the predetermined value PTb. In a case that the inner pressure PT is higher than the predetermined value PTb, that is, the inner pressure PT belongs to the above mentioned determination region Rb, the ECU 70 drives the closing valve 20 with the drive cycle B in step S30 and returns to step S23. On the other hand, in a case that the inner pressure PT is equal to the predetermined value PTb or less, the inner pressure PT belongs to the above mentioned determination region Ra. Accordingly, the ECU 70 drives the closing valve 20 with the drive cycle A in step S31, and returns to step S23.

The processes from step S23 to step S31 are repeated until it is determined in step S24 that the inner pressure PT is equal to the predetermined value PTa or less. Due to this, as apparently shown in FIG. 9, with respect to each of the determination regions Ra to Rd, the corresponding drive cycle is kept constant within a single determination region, and the determination region belonging to a lower stage has a shorter drive cycle. In other words, in the press reducing control of the present embodiment, with respect to each of the determination regions Ra to Rd, the valve opening speed of the closing valve 20 is kept constant within a single determination region, and as the determination region belongings to a lower stage, the valve opening speed of the closing valve 20 becomes higher.

According to the third embodiment, it is possible to obtain the effects similar to the ones in the first embodiment. Further, according to the third embodiment, since the valve opening speed of the closing valve 20 is kept constant within a single determination region, insecure control because of disturbance or the like is hard to occur, which makes the control stable. Therefore, it is possible to reduce a risk such that the flow rate of the vapor passage 19 exceeds the boundary flow rate during the pressure reducing control.

(A Fourth Embodiment)

Figure 10:
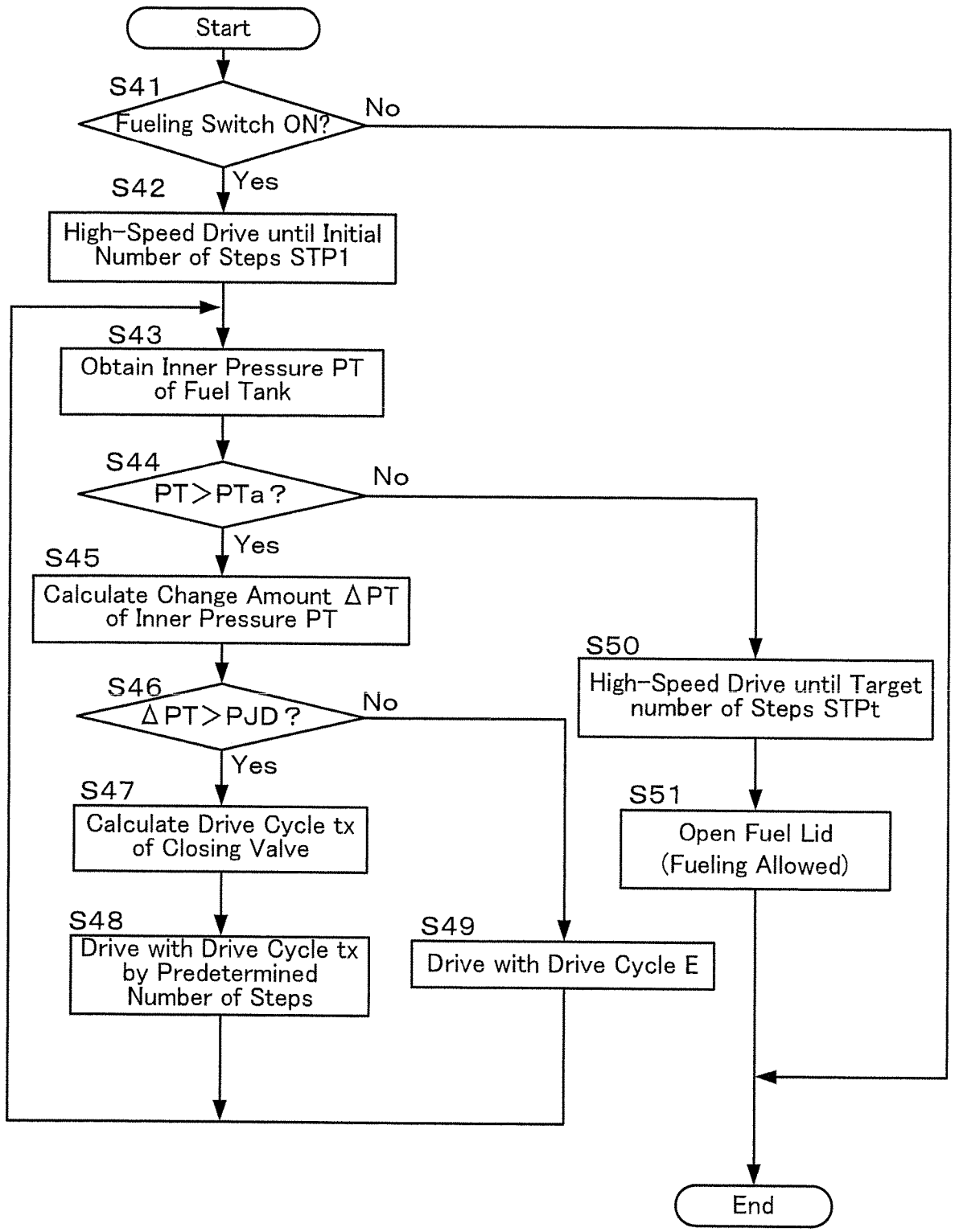
FIG. 10 is a flow chart showing one example of a control routine relating to a fourth embodiment.
Figure 11:
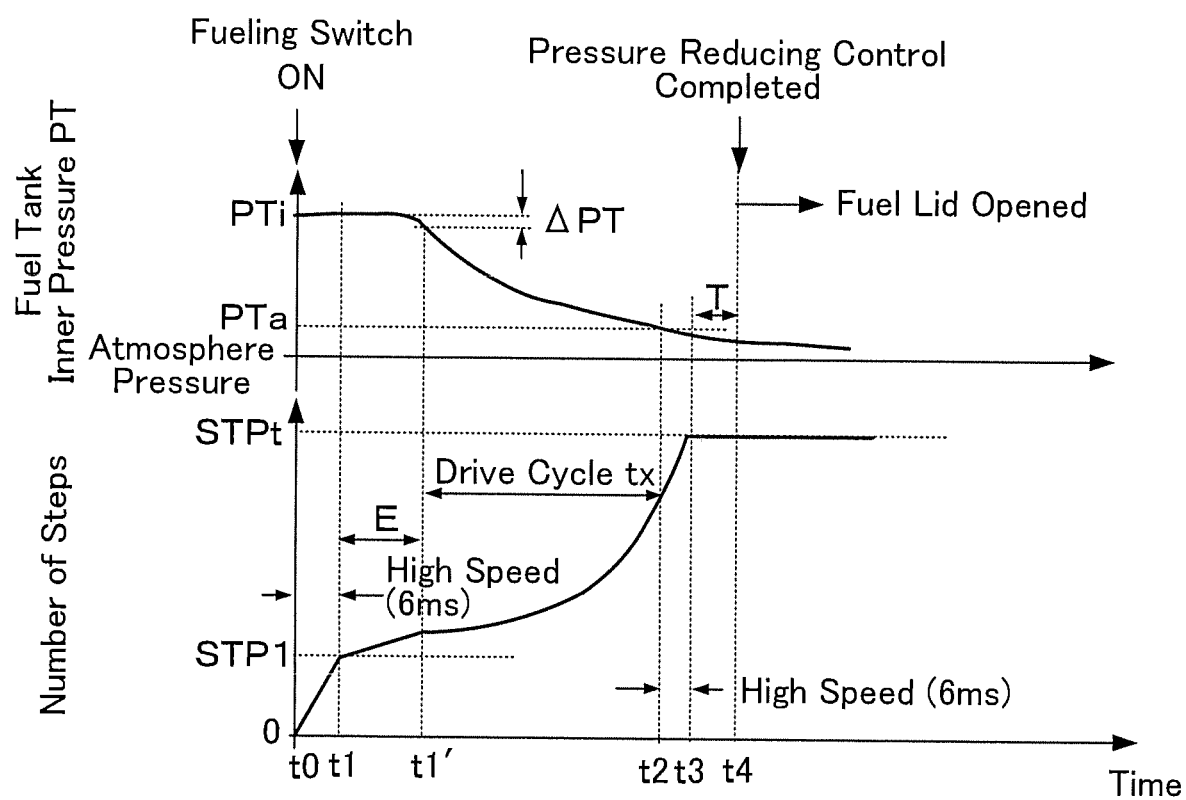
FIG. 11 is a time chart schematically showing one example of a control result relating to the fourth embodiment.

The following describes the fourth embodiment in reference to FIGS. 10 and 11. The fourth embodiment is shared with the first embodiment except the pressure reducing control. Accordingly, in the following descriptions, the descriptions, such as physical constructions, to be shared with the first embodiment are omitted, and the descriptions and figures in the first embodiment should be referred to as appropriate.

The ECU 70 executes a control routine shown in FIG. 10 to realize the control in the fourth embodiment, and thereby the ECU 70 functions as one example of a control device relating to the present invention. In the fourth embodiment, the ECU 70 sets the valve opening speed of the closing valve 20 to a limit speed at which the flow rate of the vapor passage 19 does not exceed the boundary flow rate from start of the pressure reducing control until a change amount of the inner pressure of the fuel tank 3 exceeds a predetermined amount. The computer program for the control routine shown in FIG. 10 is read out as appropriate and repeatedly executed at predetermined intervals by the ECU 70.

In step S41, the ECU 70 determines whether or not the fueling switch 13 is set to ON. In a case that the fueling switch 13 is set to ON, the ECU 70 goes to step S42, and if not, the ECU 70 skips the following steps and ends the routine. In step S42, the ECU 70 drives the stepping motor 32 at high speed until the initial number of steps STP1. For the high-seed drive of step S42, the drive cycle is set to a constant value, for example, 6 [ms]. In step S43, the ECU 70 obtains the inner pressure PT of the fuel tank 3 by referring to the output signal of the pressure sensor 29 provided to the fuel tank 3.

In step S44, the ECU 70 determines whether or not the inner pressure PT of the fuel tank 3 is higher than the predetermined value PTa. The predetermined value PTa is the same as the one in the first embodiment. Accordingly, in a case that the inner pressure PT of the fuel tank 3 is higher than the predetermined value PTa, the ECU 70 executes the processes from step S45 to step S49 so that the flow rate of th vapor passage 19 does not exceed the boundary flow rate. On the other hand, in a case that the inner pressure PT is equal to the predetermined value PTa or less, the flow rate of the vapor passage 19 does not exceed the boundary flow rate even if the closing valve 20 is opened with any open degree. Due to this, the ECU 70 goes to step S50 to drive the stepping motor 32 at high speed until the target number of steps STPt for completing the pressure reducing control. And then, in step S51, the ECU 70 controls the lid driving device 14 so as to open the fuel lid 12 and ends the routine.

In step S45, the ECU 70 calculates the change amount ΔPT of the inner pressure of the fuel tank 3. As shown in FIG. 11, the change amount ΔPT is defined as a difference between an initial inner pressure PTi and a current inner pressure PT. The initial inner pressure PTi is an inner pressure of the fuel tank 3 at the moment when the press reducing control starts.

In step S46, the ECU 70 determines whether the change amount ΔPT is larger than a predetermined amount PJD. The predetermined amount PJD is set as appropriate as a value which makes it possible to determine that the change of the inner pressure PT of the fuel tank 3 corresponds to pressure reduction due to the valve opening of the closing valve 20. In a case that the change amount ΔPT is larger than the predetermined amount PJD, the ECU 70 goes to step S47. In step S47, as with the first embodiment, the ECU 70 calculates the drive cycle tx, and in next step S48, the ECU 70 drives the closing valve 20 with the drive cycle tx and returns to step S43.

On the other hand, in a case that the change amount ΔPT is equal to the predetermined amount PJD or less, it is possible to determine that the pressure reduction due to valve opening of the closing valve 20 is not started. Therefore, the ECU 70 drives the closing valve 20 with a drive cycle E which is set so that the valve opening speed is set as high as possible within the range that the flow rate of the vapor passage 19 does not exceed the boundary flow rate.

And, the ECU 70 returns to step S43. Thereby, the valve opening speed of the closing valve 20 is kept until it is determined in step S46 that the change amount ΔPT of the inner pressure PT exceeds the predetermined value PJD. Accordingly, in order to make a difference between the first and fourth embodiments comprehensible, the difference will be described by comparing FIG. 11 to FIG. 5 of the first embodiment. In the fourth embodiment, the closing valve 20 is driven with the drive cycle E from time t1 when the number of steps has reached the initial number of steps STP1 until time t1'. Therefore, in comparison with the first embodiment, the time t1' for starting the control depending on the change of the inner pressure PT of the fuel tank 3 gets later, and the control time, that is, the time from the time t1' to time t2 gets shorter.

According to the fourth embodiment, it is possible to obtain the effects similar to the ones in the first embodiment. Further, according to the fourth embodiment, it is possible to make the valve opening speed of the closing valve 20 higher within the range that the flow rate of the vapor passage 19 does not exceed the boundary flow rate, until the change amount ΔPT of the inner pressure PT of the fuel tank 3 reaches the predetermined amount PJD. Thereby, it is possible to complete the pressure reducing control in a further shorter time.

The predent invention is not limited to the above embodiments, and may be executed in various embodiments within the range of the summary of the present invention. The closing valve 20 in the above each embodiment is a mere one example. A valve which does not have the dead zone with respect to the open direction on its design may be employed. Further, even if having the dead zone with respect to the open direction, the closing valve 20 may have a construction different from the construction in the above embodiments. For example, a ball valve may be employed as the closing valve, the ball valve: having a spherical valve element where a penetrating flow passage is formed and a valve seat holding the valve element rotatably and communicating the vapor passage; and being capable of controlling the open degree by rotating the valve element with a motor.

Further, regardless of whether the closing valve has the dead zone on its design, the present invention is not based on the premise of execution of the learning process where the valve opening start position of the closing valve is learned. Accordingly, differently from the above embodiments, the present invention is possible to be executed as an evaporated fuel treatment device where the learning process for the valve opening start position of the closing valve is not executed.

This application claims the benefit of foreign priority to Japanese Patent Application No. JP2017-048699, filed Mar. 14, 2017, which is incorporated by reference in its entirety.

What is claimed is:

1. An evaporated fuel treatment device comprising:
   a canister which sorbs evaporated fuel generated in a fuel tank of a vehicle;
   a vapor passage which connects between the canister and the fuel tank;
   a closing valve which is provided to the vapor passage and allowed to change an opening degree so as to control a flow rate of the evaporated fuel flowing in the vapor passage;
   a valve mechanism which opens and closes the vapor passage by using a displacement of a float type valve element depending on a fuel level of the fuel tank; and
   a control device which is a computer, and by executing a computer program, configured to execute a pressure reducing control where the closing valve is controlled so that an inner pressure of the fuel tank is reduced prior to fueling to the fuel tank;

wherein the control device is configured to control the pressure reducing control with monitoring the inner pressure so that, in a case that the inner pressure exceeds a predetermined value prior to the fueling to the fuel tank, reduction of the inner pressure progresses within a range that a flow rate of the vapor passage does not exceed a boundary flow rate where the vapor passage is closed by the valve element of the valve mechanism, and a valve opening speed of the closing valve is made higher as the inner pressure becomes lower;

wherein the closing valve has a dead zone with respect to an open direction in a state that that the vapor passage is closed by the closing valve, and wherein the control device is configured to execute the pressure reducing control, so that, in a case that the control device is configured to be capable of executing a learning process for memorizing a valve opening start position where the vapor passage is allowed to open beyond the dead zone of the closing valve, and that the valve opening start position is held, the valve opening speed up to the valve opening start position is made higher than the valve opening speed after the valve opening start position.

2. An evaporated fuel treatment device comprising:

a canister which sorbs evaporated fuel generated in a fuel tank of a vehicle;

a vapor passage which connects between the canister and the fuel tank;

a closing valve which is provided to the vapor passage and allowed to change an opening degree so as to control a flow rate of the evaporated fuel flowing in the vapor passage;

a valve mechanism which opens and closes the vapor passage by using a displacement of a float type valve element depending on a fuel level of the fuel tank; and a control device which is a computer, and by executing a computer program, configured to execute a pressure reducing control where the closing valve is controlled so that an inner pressure of the fuel tank is reduced prior to fueling to the fuel tank;

wherein the control device is configured to control the pressure reducing control with monitoring the inner pressure so that, in a case that the inner pressure exceeds a predetermined value prior to the fueling to the fuel tank, reduction of the inner pressure progresses within a range that a flow rate of the vapor passage does not exceed a boundary flow rate where the vapor passage is closed by the valve element of the valve mechanism, and a valve opening speed of the closing valve is made higher as the inner pressure becomes lower;

wherein a plurality of determination regions with respect to the inner pressure is provided, the plurality of determination regions being staged according to magnitude of the inner pressure, and wherein the control device is configured to execute the pressure reducing control so that the valve opening speed of the closing valve is kept constant within a single determination region, and the valve opening speed of the closing valve is made higher as the determination region corresponds to a lower stage.

3. An evaporated fuel treatment device comprising:

a canister which sorbs evaporated fuel generated in a fuel tank of a vehicle;

a vapor passage which connects between the canister and the fuel tank;

a closing valve which is provided to the vapor passage and allowed to change an opening degree so as to control a flow rate of the evaporated fuel flowing in the vapor passage;

a valve mechanism which opens and closes the vapor passage by using a displacement of a float type valve element depending on a fuel level of the fuel tank; and a control device which is a computer, and by executing a computer program, configured to execute a pressure reducing control where the closing valve is controlled so that an inner pressure of the fuel tank is reduced prior to fueling to the fuel tank;

wherein the control device is configured to control the pressure reducing control with monitoring the inner pressure so that, in a case that the inner pressure exceeds a predetermined value prior to the fueling to the fuel tank, reduction of the inner pressure progresses within a range that a flow rate of the vapor passage does not exceed a boundary flow rate where the vapor passage is closed by the valve element of the valve mechanism, and a valve opening speed of the closing valve is made higher as the inner pressure becomes lower; and wherein the control device is configured to control the closing valve, so that the closing valve is driven at a valve opening speed which is set within a range that the flow rate of the vapor passage does not exceed the boundary flow rate until change amount of the inner pressure exceeds a predetermined amount from the pressure reducing control is started.

* * * * *